United States Patent
Nakamura et al.

(10) Patent No.: US 12,507,328 B2
(45) Date of Patent: Dec. 23, 2025

(54) HIGH-FREQUENCY TREATMENT DEVICE

(71) Applicant: Panasonic Intellectual Property Management Co., Ltd., Osaka (JP)

(72) Inventors: Hideki Nakamura, Kyoto (JP); Daisuke Hosokawa, Shiga (JP); Yoshiharu Oomori, Shiga (JP); Kazuki Maeda, Shiga (JP); Takashi Uno, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 792 days.

(21) Appl. No.: 17/758,575

(22) PCT Filed: Feb. 16, 2021

(86) PCT No.: PCT/JP2021/005595
§ 371 (c)(1),
(2) Date: Jul. 10, 2022

(87) PCT Pub. No.: WO2021/166869
PCT Pub. Date: Aug. 26, 2021

(65) Prior Publication Data
US 2023/0047831 A1    Feb. 16, 2023

(30) Foreign Application Priority Data

Feb. 21, 2020 (JP) ................. 2020-027702

(51) Int. Cl.
*H05B 6/68*    (2006.01)
*H05B 6/70*    (2006.01)

(52) U.S. Cl.
CPC ............ *H05B 6/686* (2013.01); *H05B 6/688* (2013.01); *H05B 6/70* (2013.01)

(58) Field of Classification Search
CPC . B64C 2003/148; B64C 27/467; B64C 27/48; B64C 27/001; F05D 2240/30;
(Continued)

(56) References Cited

U.S. PATENT DOCUMENTS

| 6,166,363 A * | 12/2000 | Shon | H05B 6/687 |
| | | | 219/709 |
| 2010/0176121 A1* | 7/2010 | Nobue | H05B 6/686 |
| | | | 219/716 |

(Continued)

FOREIGN PATENT DOCUMENTS

| EP | 3 503 680 | 6/2019 |
| WO | 2014/188422 | 11/2014 |

OTHER PUBLICATIONS

English Translation of Chinese Search Report dated Oct. 17, 2024 for the related Chinese Patent Application No. 202180014884.4.
(Continued)

*Primary Examiner* — Quang T Van
(74) *Attorney, Agent, or Firm* — Wenderoth, Lind & Ponack, L.L.P.

(57) ABSTRACT

This high-frequency treatment device includes: a heating chamber configured to accommodate a heating target; a high-frequency power generator; a feeder; a detector; a controller; and a storage. The high-frequency power generator generates high-frequency power having a frequency in a predetermined frequency band. The feeder supplies incident microwave power corresponding to the high-frequency power to the heating chamber. The detector detects at least one of the incident microwave power and reflected microwave power that is included in the incident microwave power and returns from the heating chamber to the feeder. The controller controls heating of the heating target by controlling the high-frequency power generator. The storage stores, together with time elapsed from the start of heating, (Continued)

information detected by the detector. The controller causes the high-frequency power generator to repeatedly generate, on a per frequency basis, the high-frequency power having a plurality of frequencies for the heating. The controller properly controls heating of the heating target on the basis of a temporal change in one of the reflected microwave power, a reflection ratio, and a microwave power difference.

11 Claims, 11 Drawing Sheets

(58) Field of Classification Search
CPC ......... Y02T 50/10; Y02T 50/60; H05B 6/686; H05B 6/688; H05B 6/70; H05B 6/705
USPC ....... 219/703, 702, 704, 705, 709, 710, 711, 219/715, 716, 719, 690, 694, 695
See application file for complete search history.

(56) References Cited

U.S. PATENT DOCUMENTS

| | | |
|---|---|---|
| 2013/0080098 A1 | 3/2013 | Hadad et al. |
| 2016/0088689 A1 | 3/2016 | Torres et al. |
| 2016/0095171 A1 | 3/2016 | Chaimov et al. |
| 2019/0380177 A1 | 12/2019 | Chaimov et al. |

OTHER PUBLICATIONS

International Search Report of PCT application No. PCT/JP2021/005595 dated Apr. 20, 2021.
Extended European Search Report issued Jul. 13, 2023 in related European Patent Application No. 21756990.4.

* cited by examiner

HIGH-FREQUENCY TREATMENT DEVICE

BACKGROUND

1. Technical Field

The present disclosure relates to a high-frequency treatment device including a high-frequency power generator.

2. Description of the Related Art

In recent years, a heating device that uses high-frequency waves includes: a heating chamber that accommodates a heating target; a high-frequency power generator; a detector; and a controller. The high-frequency power generator, which includes a semiconductor oscillator, generates high-frequency power having a frequency selected from a predetermined frequency band. The detector, which is disposed between the high-frequency power generator and the heating chamber, detects incident microwave power and reflected microwave power.

The incident microwave power is high-frequency power that is supplied from the high-frequency power generator to the heating chamber. The reflected microwave power is high-frequency power that is included in the incident microwave power supplied to the heating chamber and returns from the heating chamber to the high-frequency power generator. The controller controls the output level and the phase of the high-frequency power on the basis of the values detected by the detector.

CITATION LIST

Patent Literature

PTL 1: International Publication No. 2014/188422

SUMMARY

However, Patent Literature (PTL) 1 does not specifically disclose how to heat a heating target using the incident microwave power and the reflected microwave power.

The existing heating process includes at least one of the step of detecting to what extent a heating target that is frozen has been defrosted and the step of detecting to what extent the heating target has expanded. However, existing methods for detecting various states including detecting defrosting of the heating target and detecting expansion of the heating target are not necessarily effective.

The present disclosure has an object to properly control heating of a heating target by detecting the state of the heating target.

A high-frequency treatment device according to one aspect of the present disclosure includes: a heating chamber configured to accommodate a heating target; a high-frequency power generator; a feeder; a controller and a storage.

The high-frequency power generator generates high-frequency power having a frequency in a predetermined frequency band. The feeder supplies incident microwave power corresponding to the high-frequency power to the heating chamber. The detector detects at least one of the incident microwave power and reflected microwave power that is included in the incident microwave power and returns from the heating chamber to the feeder. The controller controls heating of the heating target by controlling the high-frequency power generator. The storage stores, together with time elapsed from the start of heating, information detected by the detector.

The controller causes the high-frequency power generator to repeatedly generate, on a per frequency basis, the high-frequency power having a plurality of frequencies for the heating. The controller controls the heating of the heating target on the basis of one of a temporal change in the reflected microwave power, a temporal change in a reflection ratio that is a ratio of the reflected microwave power to the incident microwave power, and a temporal change in a microwave power difference that is the difference between the incident microwave power and the reflected microwave power.

According to the present aspect, the heating target can be heated as desired. As a result, defrosting or expansion of the heating target can be more accurately detected.

DETAILED DESCRIPTIONS

Figure 1:
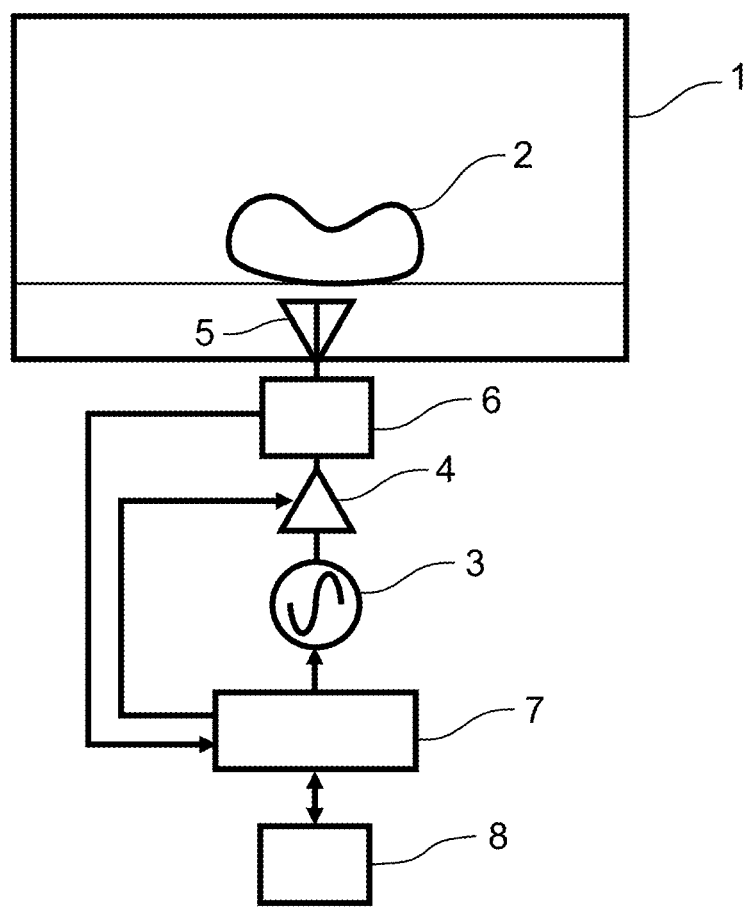
FIG. 1 is a schematic configuration diagram showing a high-frequency treatment device according to an exemplary embodiment of the present disclosure.

A high-frequency treatment device according to the first aspect of the present disclosure includes: a heating chamber configured to accommodate a heating target; a high-frequency power generator; a feeder; a controller, and a storage.

The high-frequency power generator generates high-frequency power having a frequency in a predetermined frequency band. The feeder supplies incident microwave power corresponding to the high-frequency power to the heating chamber. The detector detects at least one of the incident microwave power and reflected microwave power that is included in the incident microwave power and returns from the heating chamber to the feeder. The controller controls heating of the heating target by controlling the high-frequency power generator. The storage stores, together with time elapsed from the start of heating, information detected by the detector.

The controller causes the high-frequency power generator to repeatedly generate, on a per frequency basis, the high-frequency power having a plurality of frequencies for the heating. The controller controls the heating of the heating target on the basis of one of a temporal change in the reflected microwave power, a temporal change in a reflection ratio that is a ratio of the reflected microwave power to the incident microwave power, and a temporal change in a microwave power difference that is the difference between the incident microwave power and the reflected microwave power.

In a high-frequency treatment device according to the second aspect of the present disclosure, which is based on the first aspect, the controller ends the heating of the heating target when an amount of reduction in the temporal change in one of the reflected microwave power and the reflection ratio within a predetermined time exceeds a predetermined threshold value after the temporal change in the one of the reflected microwave power and the reflection ratio has a local maximum value.

In a high-frequency treatment device according to the third aspect of the present disclosure, which is based on the first aspect, the controller controls the heating by determining, as being caused by evaporation of water from the heating target, a change in which the temporal change in one of the reflected microwave power and the reflection ratio slows down.

In a high-frequency treatment device according to the fourth aspect of the present disclosure, which is based on the first aspect, the controller controls the heating by determining, when the temporal change in one of the reflected microwave power and the reflection ratio slows down after the one of the reflected microwave power and the reflection ratio increases, decreases, and then increases again, that evaporation of water from the heating target has occurred.

In a high-frequency treatment device according to the fifth aspect of the present disclosure, which is based on the first aspect, the controller controls the heating by determining, as a time slot in which the heating target releases latent heat, a time slot in which the temporal change in one of the reflected microwave power and the reflection ratio is small after a time slot in which the temporal change in the one of the reflected microwave power and the reflection ratio is great.

In a high-frequency treatment device according to the sixth aspect of the present disclosure, which is based on the first aspect, the controller controls the heating by determining, as stabilization of a surface state of the heating target, an increase in a degree of overlap between temporal changes in one of the reflected microwave power and the reflection ratio at the plurality of frequencies.

In a high-frequency treatment device according to the seventh aspect of the present disclosure, which is based on the first aspect, the controller controls the heating by determining a state of the heating target on the basis of a phenomenon in which an order of frequencies arranged in a descending order of the reflection ratio among the plurality of frequencies is reversed as time elapses.

In a high-frequency treatment device according to the eighth aspect of the present disclosure, which is based on the first aspect, the controller controls the heating by determining, on the basis of a change in which the microwave power difference increases with time after the temporal change in the microwave power difference has a local minimum value, that a small quantity of the heating target that is 250 g to 1.5 kg is being defrosted.

In a high-frequency treatment device according to the ninth aspect of the present disclosure, which is based on the first aspect, the controller controls the heating by determining, on the basis of a change in which the microwave power difference decreases with time and the temporal change in the microwave power difference at each of the plurality of frequencies becomes constant, that a large quantity of the heating target that is 2 kg to 5 kg is being defrosted.

In a high-frequency treatment device according to the tenth aspect of the present disclosure, which is based on the first aspect, the controller controls the heating by determining, on the basis of a change in which the microwave power difference decreases with time and microwave power differences at the plurality of frequencies approach each other with time, that the heating target that contains a large amount of water is being defrosted.

In a high-frequency treatment device according to the eleventh aspect of the present disclosure, which is based on the first aspect, the controller controls the heating by determining, on the basis of a change in which the microwave power difference decreases with time after the temporal change in the microwave power difference has a local maximum value, that the heating target is boiling.

Hereinafter, an exemplary embodiment of the present disclosure will be described with reference to the drawings.

FIG. 1 is a schematic configuration diagram showing a high-frequency treatment device according to the exemplary embodiment of the present disclosure. As shown in FIG. 1, the high-frequency treatment device according to the present exemplary embodiment includes heating chamber 1, high-frequency power generator 3, amplifier 4, feeder 5, detector 6, controller 7, and storage 8.

Heating chamber 1 accommodates heating target 2 such as food, which is a load. High-frequency power generator 3 includes a semiconductor element. High-frequency power generator 3, which is capable of generating high-frequency power having a frequency in a predetermined frequency band, generates high-frequency power having a frequency specified by controller 7.

Amplifier 4 includes a semiconductor element. Amplifier 4 amplifies, according to an instruction from controller 7, the output level of the high-frequency power generated by high-frequency power generator 3, and outputs high-frequency power at the amplified output level.

Feeder 5, which functions as an antenna, supplies the microwave amplified by amplifier 4 to heating chamber 1 as incident microwave power. In other words, feeder 5 supplies, to heating chamber 1, the incident microwave power based on the microwave generated by high-frequency power generator 3. In the incident microwave power, electric power that has not been consumed by heating target 2 or the like returns from heating chamber 1 to feeder 5 as reflected microwave power.

Detector 6 includes a directional coupler, for example. Detector 6 measures the amounts of the incident microwave power and the reflected microwave power and notifies controller 7 of this information. In other words, detector 6 functions as both an incident-microwave-power detector and a reflected-microwave-power detector.

Detector 6, which has a coupling of approximately −40 dB, for example, extracts electric power that is approximately $1/10000$ of the incident microwave power and the reflected microwave power. The extracted incident microwave power and the extracted reflected microwave power are rectified at a detector diode (not shown in the drawings), smoothed at a capacitor (not shown in the drawings), and then converted into information corresponding to the amounts of the incident microwave power and the reflected microwave power. Controller 7 receives the information from detector 6.

Storage 8, which includes semiconductor memory or the like, stores data obtained from controller 7, reads the stored data, and transmits the read data to controller 7. Specifically, storage 8 stores, together with the frequency of the microwave and time elapsed from the start of heating, the amounts of the incident microwave power and the reflected microwave power measured by detector 6 and information related to the reflected microwave power.

In the present exemplary embodiment, the information related to the reflected microwave power is, for example, the reflection ratio, that is, the ratio of the reflected microwave power to the incident microwave power. The information related to the reflected microwave power may be the difference between the incident microwave power and the reflected microwave power. Hereinafter, the difference between the incident microwave power and the reflected microwave power will be referred to as a microwave power difference.

Controller 7 includes a microprocessor including a central processing unit (CPU). On the basis of the information from detector 6 and storage 8, controller 7 controls high-frequency power generator 3 and amplifier 4 to perform a heating process for heating target 2. When heating target 2 is food, the high-frequency treatment device is a cooking appliance, and the heating process for heating target 2 is cooking of the food.

Controller 7 causes high-frequency power generator 3 to execute a frequency sweep. The frequency sweep is an operation performed by high-frequency power generator 3 to sequentially change the oscillating frequency at predetermined frequency intervals over a predetermined frequency band. In the present exemplary embodiment, the predetermined frequency band is 2.400 MHz to 2,500 MHz.

After the frequency sweep, controller 7 selects, from the predetermined frequency band, a plurality of frequencies to be used to heat heating target 2. Specifically, on the basis of the incident microwave power and the reflected microwave power detected during the frequency sweep, controller 7 calculates the efficiency of heating in which the high-frequency power is used. Controller 7 sets, to the plurality of frequencies, the frequency at which the heating is most efficient and some frequencies close to said frequency.

Controller 7 causes high-frequency power generator 3 to repeatedly generate, on a per frequency basis, the high-frequency power having the plurality of frequencies that have been set. Controller 7 causes high-frequency power generator 3 to repeatedly generate, on a per frequency basis, the high-frequency power having a plurality of frequencies for the heating. Controller 7 controls the heating of heating target 2 on the basis of one of a temporal change in the reflected microwave power, a temporal change in a reflection ratio that is a ratio of the reflected microwave power to the incident microwave power, and a temporal change in a microwave power difference that is the difference between the incident microwave power and the reflected microwave power. Controller 7 causes amplifier 4 to amplify the high-frequency power up to the output level for heating.

Controller 7 causes storage 8 to store the temporal change in the reflection ratio on the basis of the incident microwave power and the reflected microwave power detected during heating. On the basis of the change in the reflection ratio or the change in the microwave power difference, controller 7 determines the state of heating target 2 in heating chamber 1 and a change in said state. On the basis of this result, controller 7 determines whether to change the output level of the high-frequency power to be used for heating and whether to end the heating.

Hereinafter, various control methods using controller 7 according to the present exemplary embodiment will be described as Examples 1 to 10. At least two of the following examples may be arbitrarily combined as long as those do not contradict each other.

In the graphs in Examples 1 to 6, the vertical axis represents the reflection ratio (%). The vertical axis, however, may represent the absolute value of the reflected microwave power. This means that controller 7 may control the heating of heating target 2 on the basis of the reflected microwave power instead of the reflection ratio. In this case, the information related to the reflected microwave power is the amount of the reflected microwave power per se.

In the graphs in Examples 8 to 10, the vertical axis represents the microwave power difference (mW). Note that the unit of the microwave power difference is not limited to mW.

EXAMPLE 1

Figure 2:
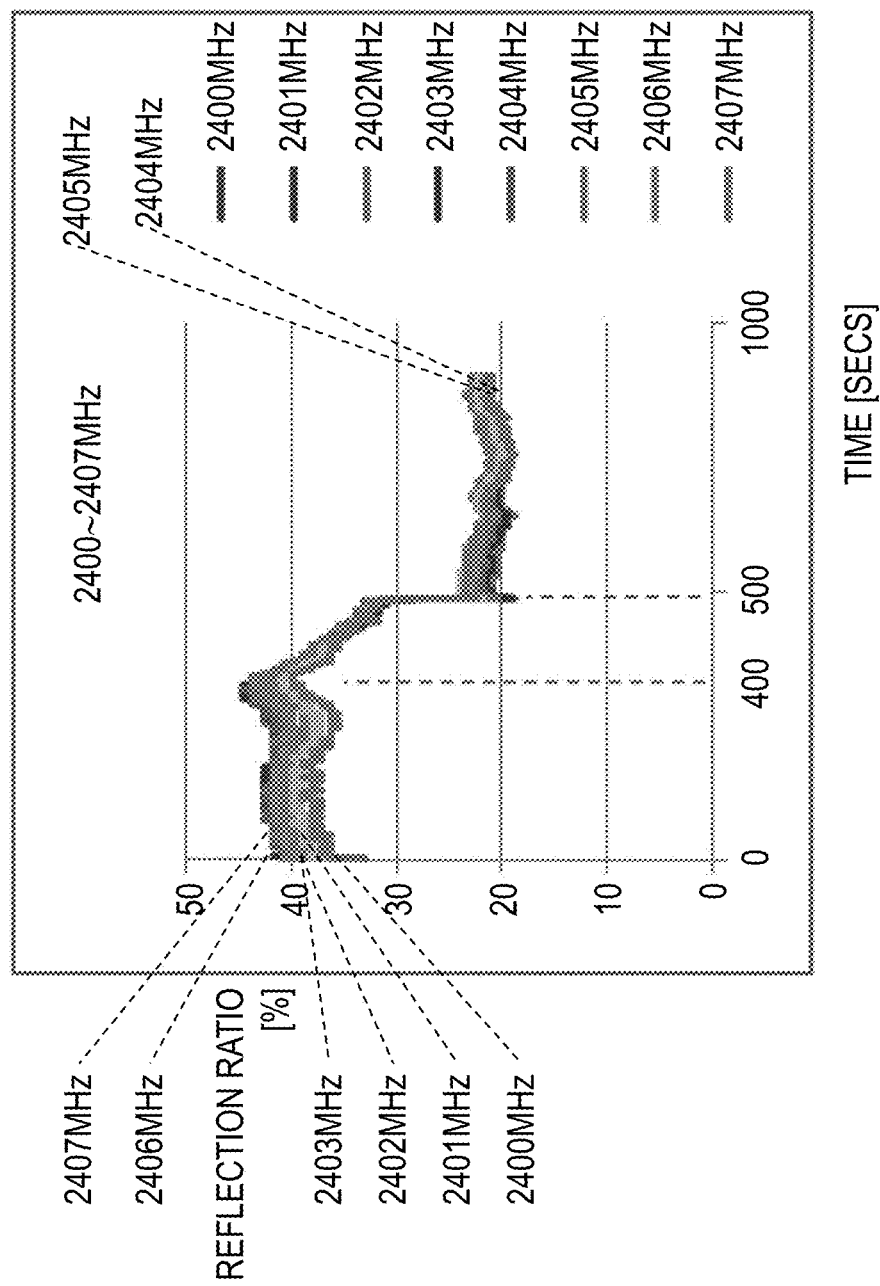
FIG. 2 is a graph showing a temporal change in a reflection ratio in Example 1 of an exemplary embodiment.

Example 1 of the present exemplary embodiment will be described. FIG. 2 is a graph showing a temporal change in the reflection ratio in the present example. In the present example, the plurality of frequencies to be used to heat heating target 2 are 2,400 MHz, 2,401 MHz, 2,402 MHz, 2,403 MHz, 2,404 MHz, 2,405 MHz, 2,406 MHz, and 2,407 MHz.

Specifically, controller 7 causes high-frequency power generator 3 to generate high-frequency power having a frequency of 2,400 MHz in the first 20-millisecond-long period and then generate high-frequency power having a frequency of 2,401 MHz in the next 20-millisecond-long period. In other words, controller 7 causes high-frequency power generator 3 to change the frequency of the high-frequency power by 1 MHz at intervals of 20 milliseconds between 2,400 MHz and 2,407 MHz.

When the frequency reaches 2,409 MHz, controller 7 causes high-frequency power generator 3 to set the frequency back to 2,400 MHz and perform substantially the same operation. FIG. 2 is a graph showing a temporal change in the reflection ratio that is obtained by repeatedly performing this sequence for approximately 900 seconds.

As shown in FIG. 2, after the lapse of approximately 400 seconds from the start of heating, the temporal change in the reflection ratio at every frequency has a local maximum value. After the lapse of approximately 500 seconds from the start of heating, the reflection ratio at every frequency rapidly decreases.

It is possible to detect the local maximum value of the temporal change in the reflection ratio by detecting a point in time at which the temporal derivative of the temporal change in the reflection ratio changes from positive to negative. It is possible to detect the rapid decrease of the reflection ratio by detecting that the temporal change in the reflection ratio within a predetermined time exceeds a predetermined threshold value.

In Example 1, when controller 7 detects the local maximum value of the temporal change in the reflection ratio at the plurality of frequencies to be used for heating, controller 7 causes amplifier 4 to increase the output level of the high-frequency power, for example, to accelerate the heating. When controller 7 detects a rapid decrease of the reflection ratio, controller 7 ends the heating.

EXAMPLE 2

Figure 3:
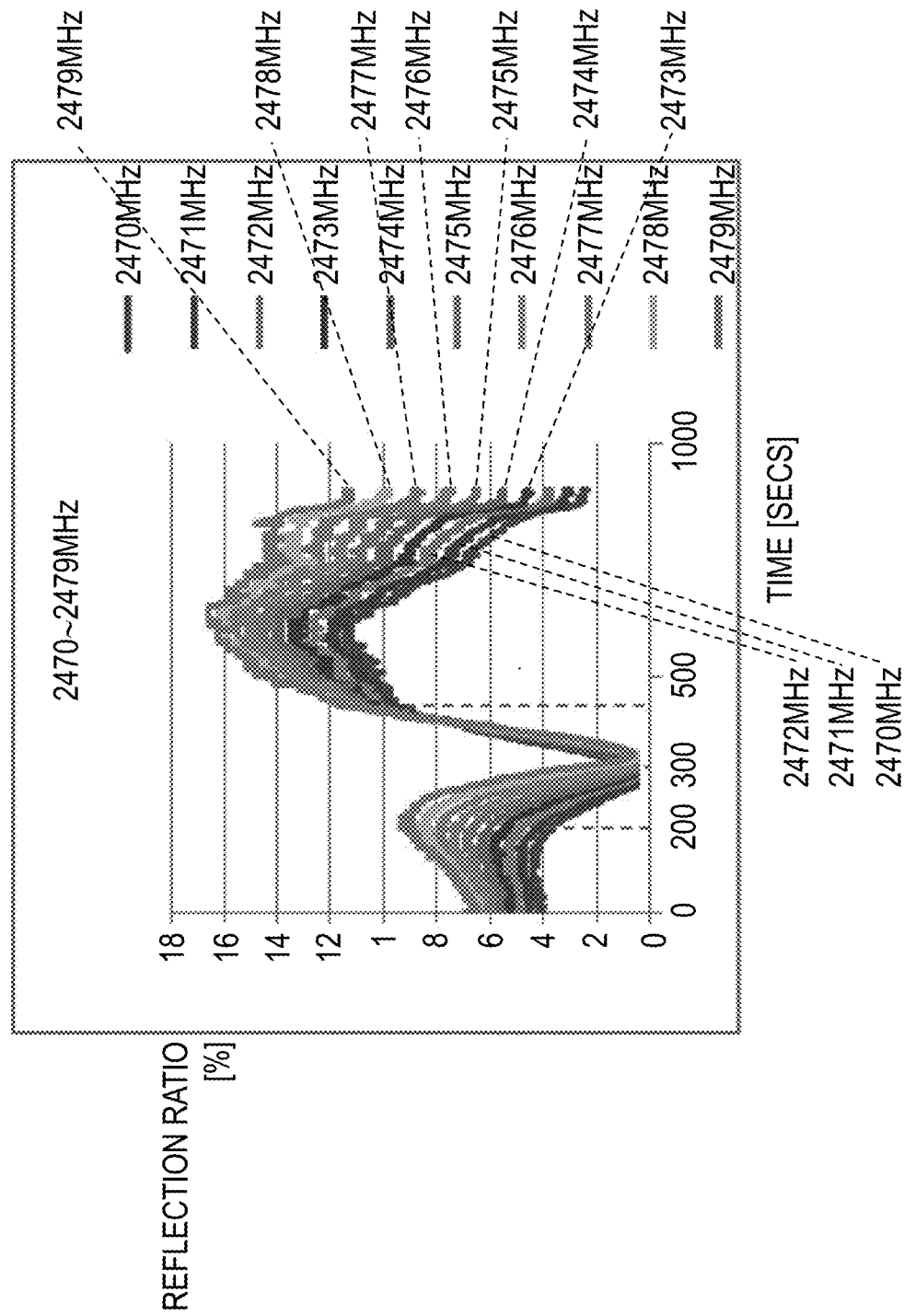
FIG. 3 is a graph showing a temporal change in a reflection ratio in Example 2 of an exemplary embodiment.

Example 2 of the present exemplary embodiment will be described. FIG. 3 is a graph showing a temporal change in the reflection ratio in the present example. In the present example, the plurality of frequencies to be used to heat heating target 2 are 2,470 MHz, 2,471 MHz, 2,472 MHz, 2,473 MHz, 2,474 MHz, 2,475 MHz, 2,476 MHz, 2,477 MHz, 2,478 MHz, and 2,479 MHz. Controller 7 causes high-frequency power generator 3 to repeatedly generate the high-frequency power having these frequencies, as in Example 1.

As shown in FIG. 3, the reflection ratio at every frequency increases, then decreases, and increases again, followed by decreasing. In the present example, controller 7 determines that a change that looks like a "valley" of the graph showing temporal changes in the reflection ratio at the plurality of frequencies is due to evaporation of water from heating target 2. On the basis of this determination, controller 7 properly controls heating of heating target 2.

Specifically, in the example shown in FIG. 3, heating target 2 is Western confectionery that expands with heat. When heated, this type of Western confectionary keeps its volume until the temperature of water therein increases to some extent. However, if the temperature of water therein increases more than this limit, the volume rapidly increases due to the expansion.

At the time when the volume expands, this type of Western confectionary releases water rapidly from the inside during expansion. The dielectric constant of water is very high; thus, when water is released in heating chamber 1, the water absorbs the high-frequency power, and the reflection ratio is reduced. The dielectric constant of water is the electric permittivity of water relative to the electric permittivity of a vacuum. When the temperature of water is 25° C. and the frequency is 2,450 MHz, the dielectric constant of the water is approximately 77.

This phenomenon in which the reflection ratio is reduced continues until evaporation of water from heating target 2 reaches a maximum and then, as the evaporation of water is reduced, the reflection ratio increases. Western confectionery that expands with heat is known to expand as water therein is released to the outside.

This means that on the basis of the reflection ratio, controller 7 can measure the degree of evaporation of water from the Western confectionery. Controller 7 can determine the degree of expansion of the Western confectionery on the basis of the degree of evaporation of water.

As shown in FIG. 3, the reflection ratio at every frequency begins to increase at the start of heating and begins to decrease after the lapse of approximately 200 seconds from the start of heating. At a point in time around this point, the temporal change in the reflection ratio has a local maximum value. This change indicates that heating target 2 begins to expand around said point in time. Hereinafter, this phenomenon will be referred to as phenomenon (a).

The reflection ratio at every frequency begins to increase again after the lapse of approximately 300 seconds from the start of heating, and the temporal change in the reflection ratio has a local minimum value. This change indicates that the largest amount of water evaporates from the Western confectionery around this point in time. Hereinafter, this phenomenon will be referred to as phenomenon (b).

The temporal change in the reflection ratio at every frequency is slow at a point in time after the lapse of approximately 500 seconds from the start of heating. This change indicates that heating target 2 expands most around this point in time. Hereinafter, this phenomenon will be referred to as phenomenon (c). In the present example, controller 7 detects phenomena (a), (b), and (c) to determine the timing of the end of the heating.

In order to detect only phenomenon (c), the condition for detection has to be defined as a condition where the temporal changes in the reflection ratio at the plurality of frequencies to be used for heating become slow. In this case, false detection is likely to occur around a point in time after the lapse of approximately 200 seconds from the start of heating. In order to prevent the false detection, the phenomena (a), (b), and (c) need to be detected in a sequence.

EXAMPLE 3

Figure 4:
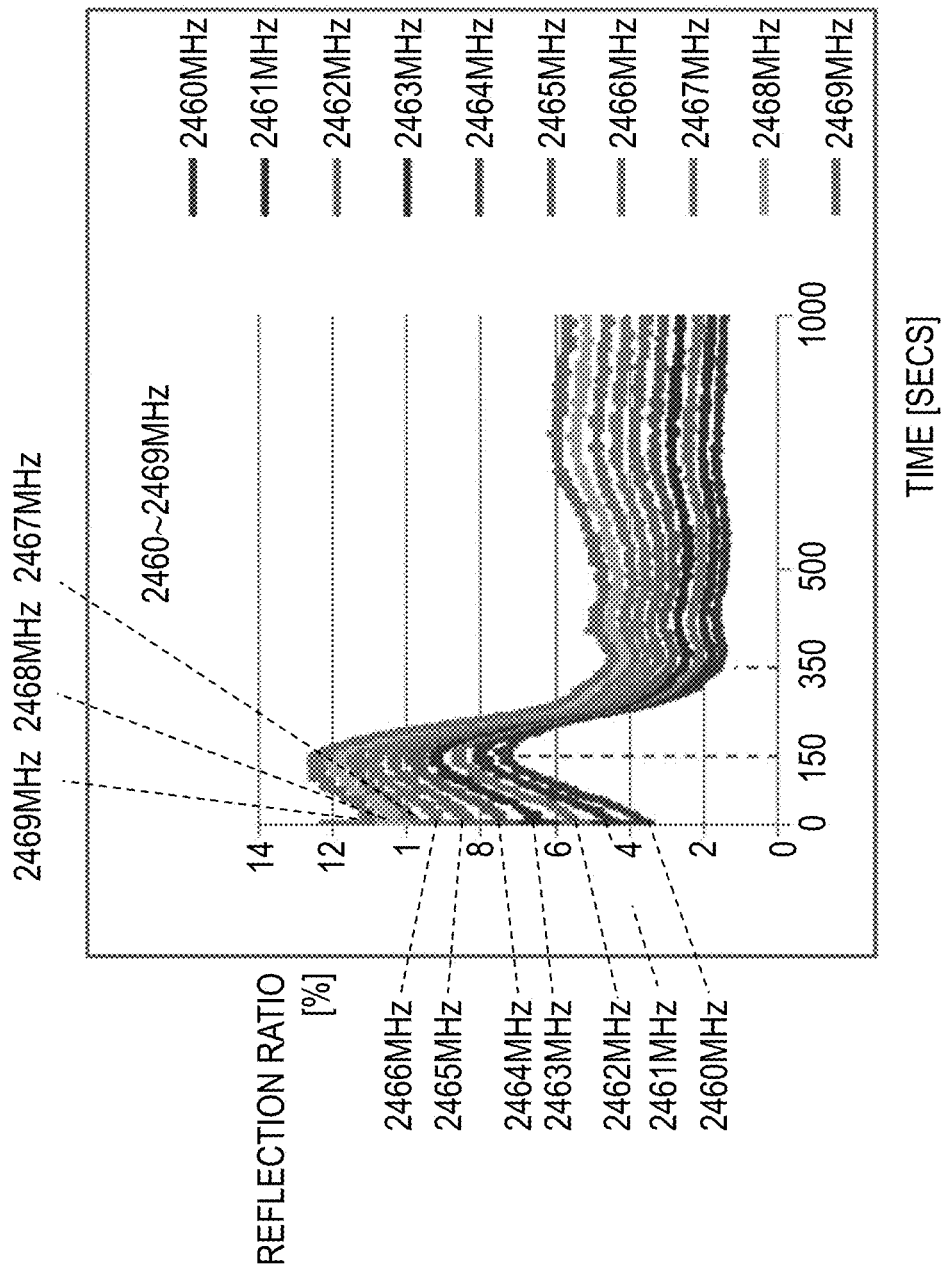
FIG. 4 is a graph showing a temporal change in a reflection ratio in Example 3 of an exemplary embodiment.

Example 3 of the present exemplary embodiment will be described. FIG. 4 is a graph showing a temporal change in the reflection ratio in the present example. In the example shown in FIG. 4, the plurality of frequencies to be used to heat heating target 2 are 2,460 MHz, 2,461 MHz, 2,462 MHz, 2,463 MHz, 2,464 MHz, 2,465 MHz, 2,466 MHz, 2,467 MHz, 2,468 MHz, and 2,469 MHz. Controller 7 causes high-frequency power generator 3 to repeatedly generate the high-frequency power having these frequencies, as in Example 1.

As shown in FIG. 4, the reflection ratio at every frequency increases and then decreases. In the present example, controller 7 determines that a change that looks like a "peak" of the graph showing temporal changes in the reflection ratio at the plurality of frequencies is due to evaporation of water from heating target 2. On the basis of this determination, controller 7 properly controls heating of heating target 2.

Specifically, the example shown in FIG. 4 is the case where heating target 2 such as a hunk of a frozen meat that is large enough and has a very low temperature (for example, less than 1 kg at −30° C. or less) is defrosted. The internal temperature of this type of heating target 2 does not easily increase even when heated from the outside. However, the temperature of the air in heating chamber 1 and the temperature of the inner wall of heating chamber 1 increase with heat from the outside. This means that the temperature in heating chamber 1 increases without evaporation of water from heating target 2.

The reflection ratio at every frequency increases as the temperature in heating chamber 1 increases. Therefore, the reflection ratio continues to increase from the start of heating until water begins to evaporate from heating target 2. When water begins to evaporate from heating target 2, the water absorbs the high-frequency power, and the reflection ratio begins to decrease.

In other words, by detecting a temporal change in the reflection ratio, it is possible to detect evaporation of water from heating target 2. On the basis of the extent of the temporal change in the reflection ratio, it is possible to find how far the defrosting of heating target 2 has proceeded.

As shown in FIG. 4, after the lapse of approximately 150 seconds from the start of heating, the temporal change in the reflection ratio at every frequency has a local maximum value. This indicates that water begins to evaporate in this time slot. In other words, this phenomenon corresponds to phenomenon (d) representing the beginning of defrosting.

After the lapse of approximately 350 seconds from the start of heating, the temporal change in the reflection ratio at every frequency has a local minimum value. This phenomenon corresponds to phenomenon (e) representing the occurrence of evaporation of the largest amount of water in this time slot. A subsequent slow change in the reflection ratio corresponds to a slow change in the amount of water that evaporates. In other words, this phenomenon corresponds to phenomenon (f) representing continuance of defrosting of heating target 2 in this time slot.

In order to detect only phenomenon (f), the condition for detection has to be defined as a condition where the reflection ratios at the plurality of frequencies to be used for heating begin to change slowly. In this case, false detection is likely to occur around a point in time after the lapse of approximately 150 seconds from the start of heating. In order to prevent the false detection, the phenomena (d), (e), and (f) need to be detected in a sequence.

EXAMPLE 4

Figure 5:
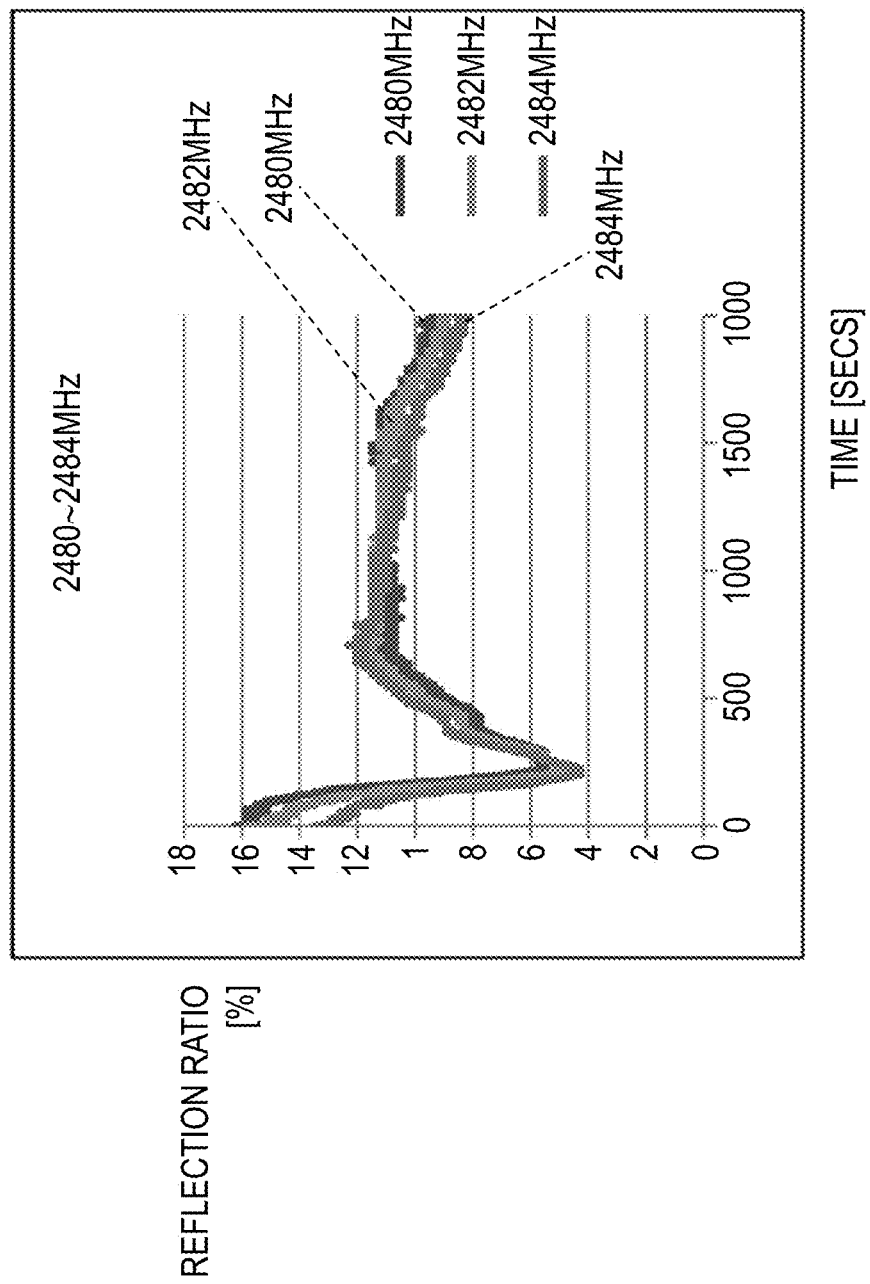
FIG. 5 is a graph showing a temporal change in a reflection ratio in Example 4 of an exemplary embodiment.

Example 4 of the present exemplary embodiment will be described. FIG. 5 is a graph showing a temporal change in the reflection ratio in the present example. In the present example, the plurality of frequencies to be used to heat heating target 2 are 2,480 MHz, 2,482 MHz, and 2,484 MHz. Controller 7 causes high-frequency power generator 3 to repeatedly generate the high-frequency power having these frequencies, as in Example 1.

In the example shown in FIG. 5, the reflection ratio at every frequency decreases once and then increases. Subsequently, however, the temporal change in the reflection ratio is small; in other words, the reflection ratio at every frequency transitions around a fixed value.

In this case, controller 7 determines that a change that looks like a "plain" of the graph showing temporal changes in the reflection ratio at the plurality of frequencies is the state where heating target 2 releases latent heat. On the basis of this determination, controller 7 properly controls heating of heating target 2.

Specifically, the example shown in FIG. 5 is the case where a hunk of a frozen meat that is very large and has a low temperature (for example, at least 1 kg at −30° C. or less) is defrosted. The internal temperature of this type of heating target 2 does not easily increase even when heated from the outside. However, when the surface of heating target 2 is mostly defrosted, the temperature of the surface increases, and frozen water therein melts. Therefore, absorption of heat reaches equilibrium. At this time, heating target 2 is stable, meaning that the reflection ratio hardly changes.

As shown in FIG. 5, the reflection ratio at every frequency changes significantly until the lapse of approximately 600 seconds from the start of heating. Subsequently, however, the reflection ratio does not change as much as it has.

Controller 7 determines the state of heating target 2 by determining that a time slot in which the temporal changes in the reflection ratio at the plurality of frequencies to be used for heating are small is a time slot in which heating target 2 releases latent heat. On the basis of this determination, controller 7 properly controls heating of heating target 2.

EXAMPLE 5

Figure 6:
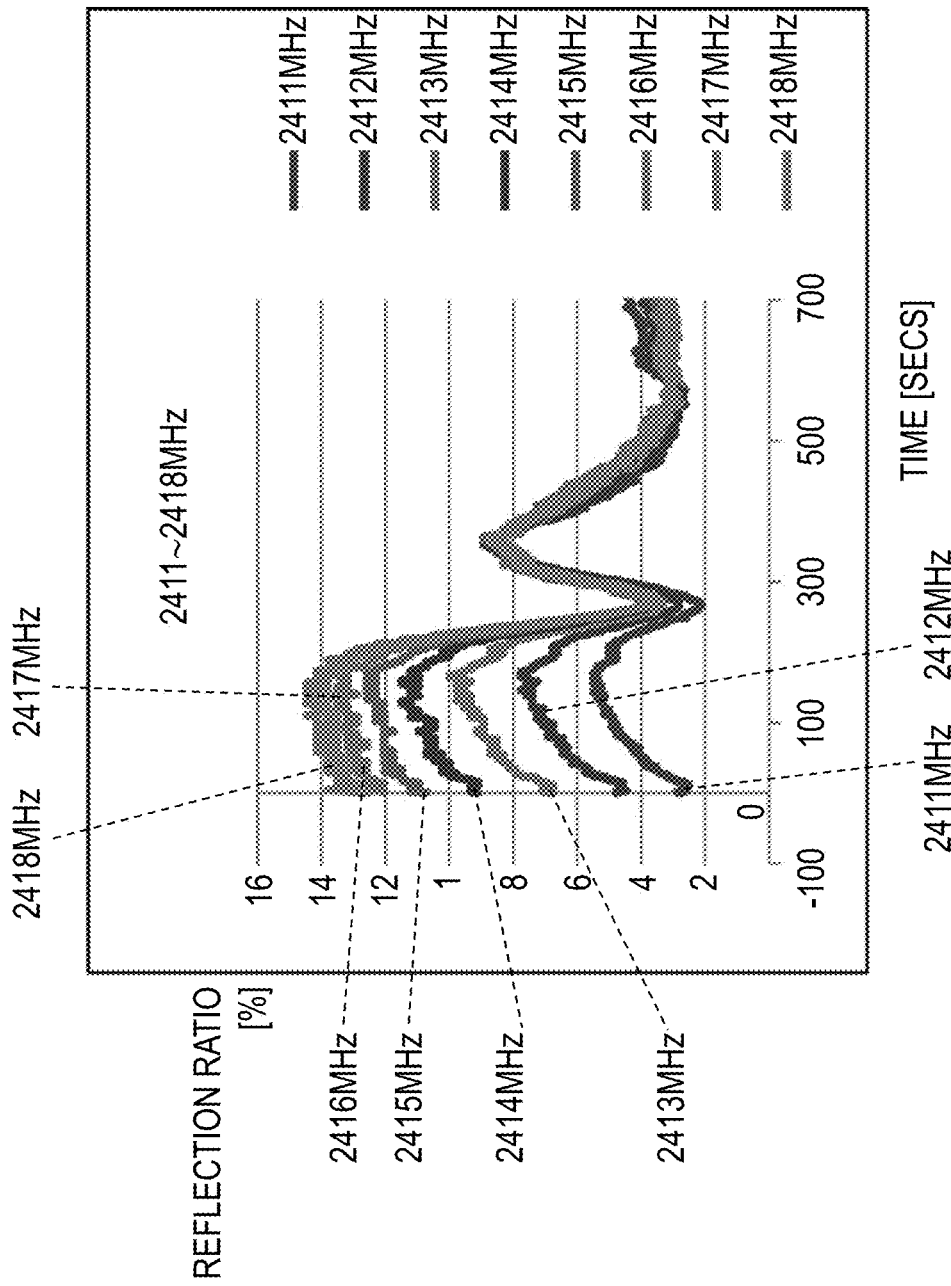
FIG. 6 is a graph showing a temporal change in a reflection ratio in Example 5 of an exemplary embodiment.

Example 5 of the present exemplary embodiment will be described. FIG. 6 is a graph showing a temporal change in the reflection ratio in the present example. In the present example, the plurality of frequencies to be used to heat heating target 2 are 2,411 MHz, 2,412 MHz, 2,413 MHz, 2,414 MHz, 2,415 MHz, 2,416 MHz, 2,417 MHz, and 2,418 MHz. Controller 7 causes high-frequency power generator 3 to repeatedly generate the high-frequency power having these frequencies, as in Example 1.

In the example shown in FIG. 6, a time slot in which the difference between temporal changes in the reflection ratio at all the frequencies is large transitions to a time slot in which said difference is small. In this case, controller 7 determines that a change that looks like "convergence" of the graphs showing temporal changes in the reflection ratio at the plurality of frequencies is stabilization of the surface state of heating target 2. On the basis of this determination, controller 7 properly controls heating of heating target 2.

Specifically, in the example shown in FIG. 6, heating target 2 is a pastry dough for cream puff shells. Hereinafter, the pastry dough for cream puff shells will be simply referred to as a dough. The main ingredients of the dough are flour, water, and sugar. The dough is heated up to approximately 200° C. through oven heating or the like, and when the temperature thereof reaches a predetermined temperature, the dough begins to expand. The oven heating is a type of heating that uses radiation heating and convection heating.

However, generally, in the oven heating, the temperature in heating chamber 1 does not remain the same at a set temperature and varies depending on the position. There is, however, a frequency band in which this variation is less likely to be detected. In order to solve this problem, the high-frequency power having the plurality of frequencies is used for heating in the present exemplary embodiment.

In the example shown in FIG. 6, the temporal changes in the reflection ratio at the plurality of frequencies rarely overlap each other until the lapse of approximately 300 seconds from the start of heating. Subsequently, however, the temporal changes in the reflection ratio at the plurality of frequencies mostly overlap each other.

Thus, on the basis of the increased overlap between the temporal changes in the reflection ratio at the plurality of frequencies to be used for heating, controller 7 determines that the surface state of heating target 2 is stabilized. On the basis of this determination, controller 7 properly controls heating of heating target 2.

EXAMPLE 6

Figure 7:
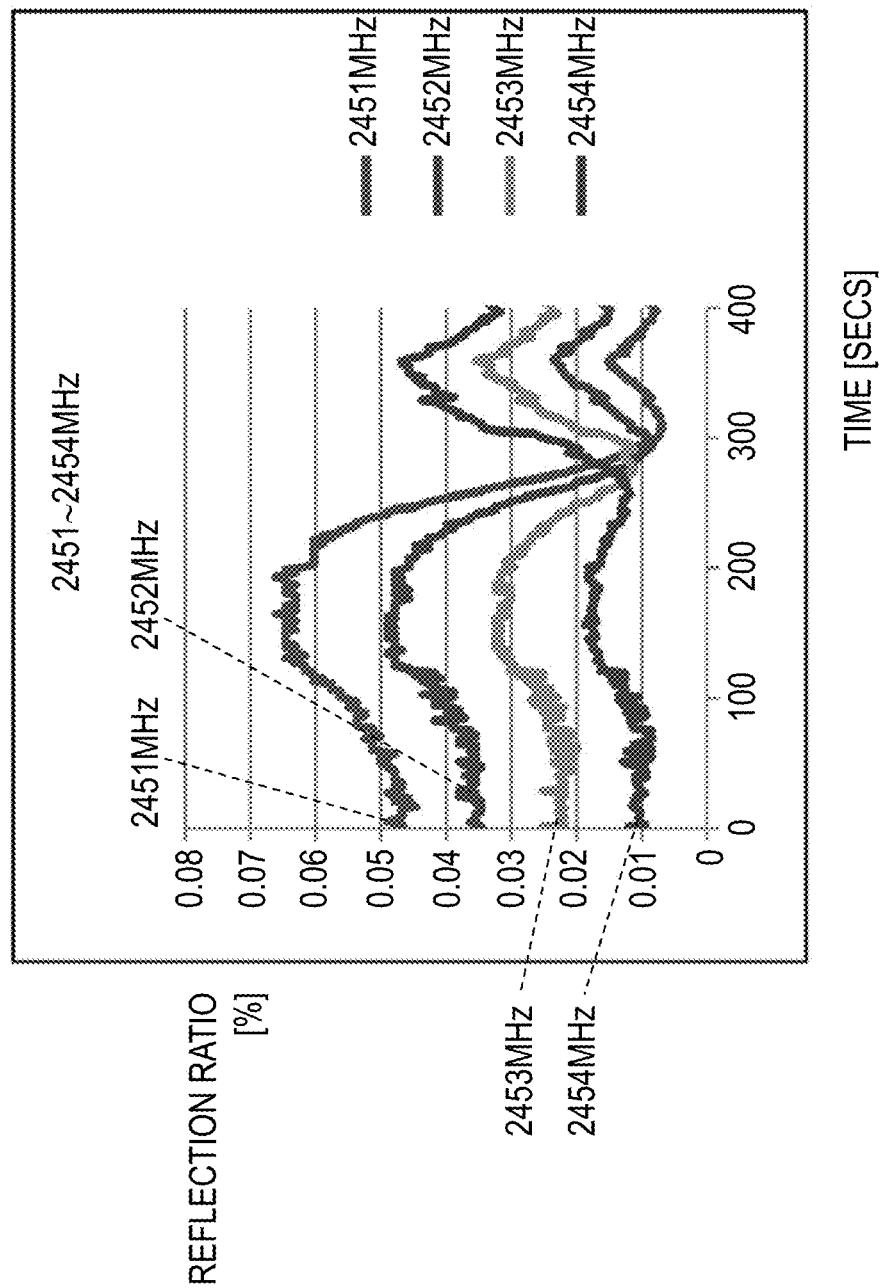
FIG. 7 is a graph showing a temporal change in a reflection ratio in Example 6 of an exemplary embodiment.

Example 6 of the present exemplary embodiment will be described. FIG. 7 is a graph showing a temporal change in the reflection ratio in the present example. In the present example, the plurality of frequencies to be used to heat heating target 2 are 2,451 MHz, 2,452 MHz, 2,453 MHz, and 2,454 MHz. Controller 7 causes high-frequency power generator 3 to repeatedly generate the high-frequency power having these frequencies, as in Example 1.

As shown in FIG. 7, among the plurality of frequencies to be used for heating, a lower frequency is associated with a higher reflection ratio until the lapse of approximately 280 seconds from the start of heating. Subsequently, however, a higher frequency among the plurality of frequencies is associated with a higher reflection ratio. This means that controller 7 determines the state of heating target 2 on the basis of a phenomenon in which the order of frequencies arranged in the descending order of the reflection ratio among the plurality of frequencies to be used for heating is reversed as time elapses. On the basis of this determination, controller 7 properly controls heating of heating target 2.

Specifically, in the example shown in FIG. 7, heating target 2 is a pastry dough for cream puff shells, as in Example 5. As mentioned above, the main ingredients of the dough are flour, water, and sugar. The dough is heated up to approximately 200° C. through oven heating or the like, and when the temperature thereof reaches a predetermined temperature, the dough begins to expand.

However, generally, in the oven heating, the temperature in heating chamber 1 does not remain the same at a set temperature and varies depending on the position. In addition, the high-frequency power supplied to heating chamber 1 is repeatedly reflected inside heating chamber 1, and thus a standing wave is formed in heating chamber 1. This standing wave leads to further variations in the temperature in heating chamber 1.

Therefore, the dough includes a high temperature portion and a low temperature portion. As a result, the dough (shape, water content, temperature) becomes more likely to absorb the high-frequency power having a specific frequency. Subsequently, heat transfers inside the dough, and thus the internal state of the dough changes. Consequently, a frequency at which the high-frequency power is easily absorbed changes.

In order to solve this problem, the high-frequency power having the plurality of frequencies is used for heating in the present exemplary embodiment. By detecting the change shown in FIG. 7 in the temporal changes in the reflection ratio at the plurality of frequencies to be used for heating, controller 7 determines the state of heating target 2 such as that described above. On the basis of this determination, controller 7 properly controls heating of heating target 2.

EXAMPLE 7

Figure 8:
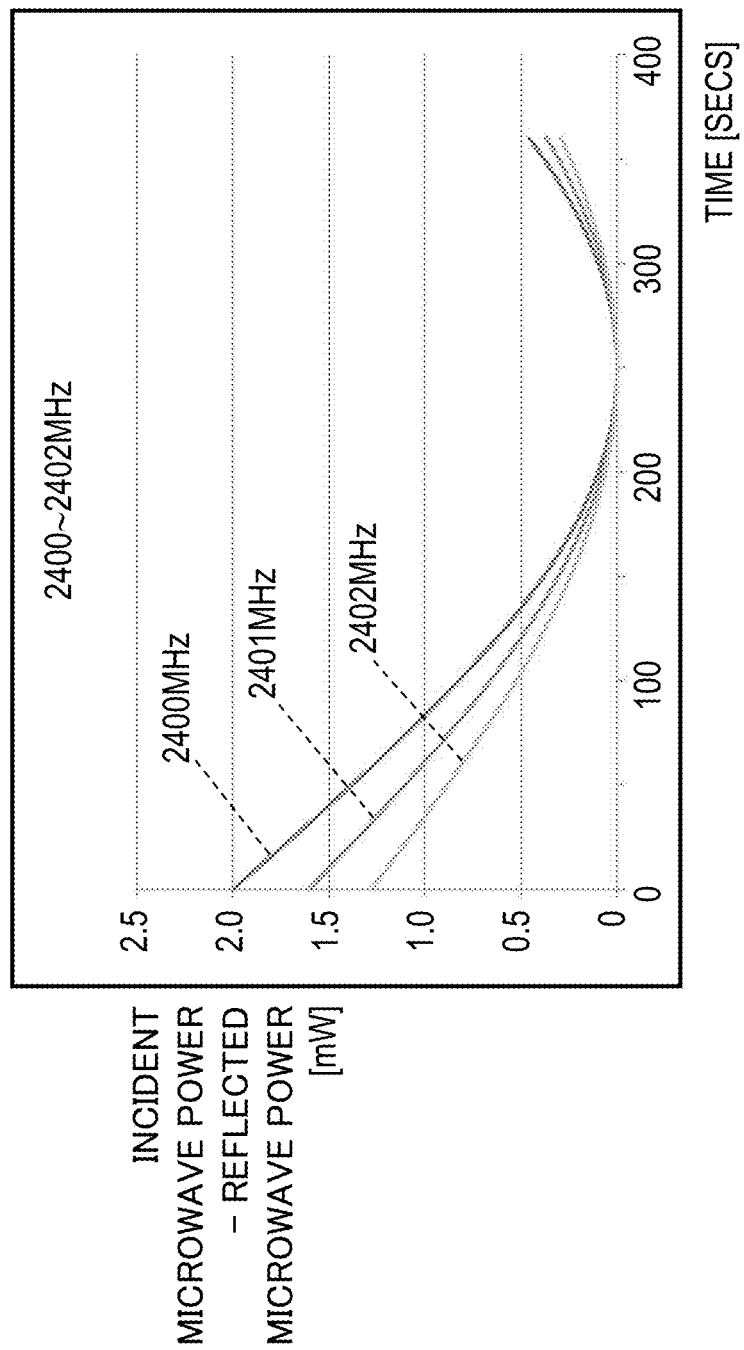
FIG. 8 is a graph showing a temporal change in the difference between incident microwave power and reflected microwave power in Example 7 of an exemplary embodiment.

Example 7 of the present exemplary embodiment will be described. FIG. 8 is a graph showing a temporal change in the microwave power difference in the present example. In the present example, the plurality of frequencies to be used to heat heating target 2 are 2,400 MHz, 2,401 MHz, and 2,402 MHz.

Specifically, controller 7 causes high-frequency power generator 3 to generate high-frequency power having a frequency of 2,400 MHz in the first 20-millisecond-long period and then generate high-frequency power having a frequency of 2,401 MHz in the next 20-millisecond-long period. In other words, controller 7 causes high-frequency power generator 3 to change the frequency of the high-frequency power by 1 MHz at intervals of 20 milliseconds between 2,400 MHz and 2,402 MHz.

When the frequency reaches 2,402 MHz, controller 7 causes high-frequency power generator 3 to set the frequency back to 2,400 MHz and perform substantially the same operation. FIG. 8 is a graph showing a temporal change in the microwave power difference that is obtained by repeatedly performing this sequence for approximately 360 seconds.

As shown in FIG. 8, after the lapse of approximately 250 seconds from the start of heating, the temporal change in the microwave power difference at every frequency has a local minimum value. Subsequently, the microwave power difference slowly increases with time.

It is possible to detect the local minimum value of the temporal change in the reflection ratio by detecting a point in time at which the temporal derivative of the temporal change in the microwave power difference changes from negative to positive. It is possible to detect the decrease of the microwave power difference by detecting that the temporal change in the microwave power difference within a predetermined time exceeds a predetermined threshold value.

In Example 7, when controller 7 detects the local minimum value of the temporal change in the microwave power differences at the plurality of frequencies to be used for heating, controller 7 causes amplifier 4 to decrease the output level of the high-frequency power, for example, to turn down or turn off the heating.

The temporal change in the microwave power difference shown in FIG. 8 occurs during the progress of a hunk of frozen meat the quantity of which is small in the order of 250 g to 1.5 kg in the case where the hunk of frozen meat is defrosted.

EXAMPLE 8

Figure 9:
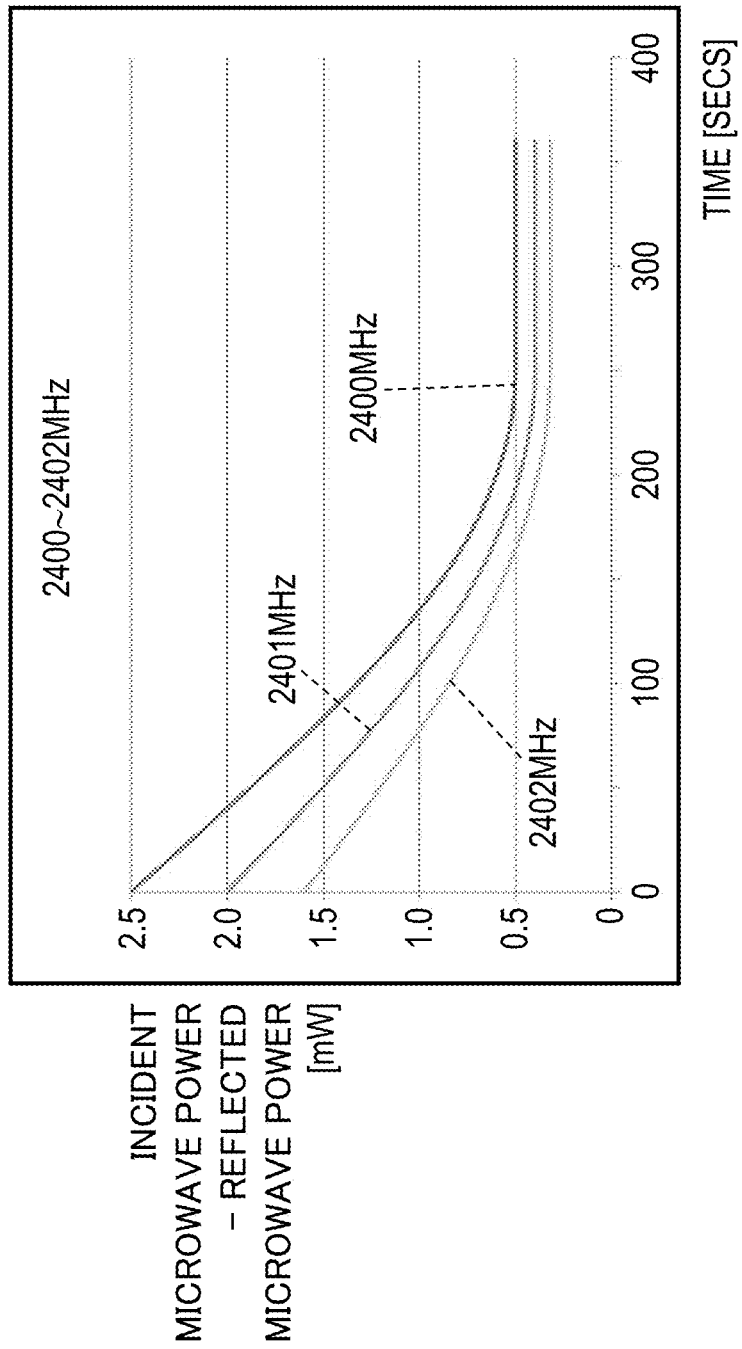
FIG. 9 is a graph showing a temporal change in the difference between incident microwave power and reflected microwave power in Example 8 of an exemplary embodiment.

Example 8 of the present exemplary embodiment will be described. FIG. 9 is a graph showing a temporal change in the microwave power difference in the present example. In the present example, the plurality of frequencies to be used to heat heating target 2 are 2,400 MHz, 2,401 MHz, and 2,402 MHz.

Controller 7 causes high-frequency power generator 3 to repeatedly generate the high-frequency power having these frequencies, as in Example 7.

FIG. 9 is a graph showing a temporal change in the microwave power difference that is obtained by repeatedly performing this sequence for approximately 360 seconds.

As shown in FIG. 9, the value of the microwave power difference decreases from the start of heating, and after the lapse of approximately 250 seconds, the temporal change in the microwave power difference at every frequency is constant.

It is possible to detect the decrease of the microwave power difference by detecting that the temporal change in the microwave power difference within a predetermined time exceeds a predetermined threshold value.

In Example 8, when controller 7 detects that the microwave power difference at each of the plurality of frequencies to be used for heating does not temporally change any more, controller 7 causes amplifier 4 to decrease the output level of the high-frequency power, for example, to turn down or turn off the heating.

The temporal change in the microwave power difference shown in FIG. 9 occurs during the progress of defrosting of a hunk of frozen meat the quantity of which is large in the order of 2 kg to 5 kg in the case where the hunk of frozen meat is defrosted.

EXAMPLE 9

Figure 10:
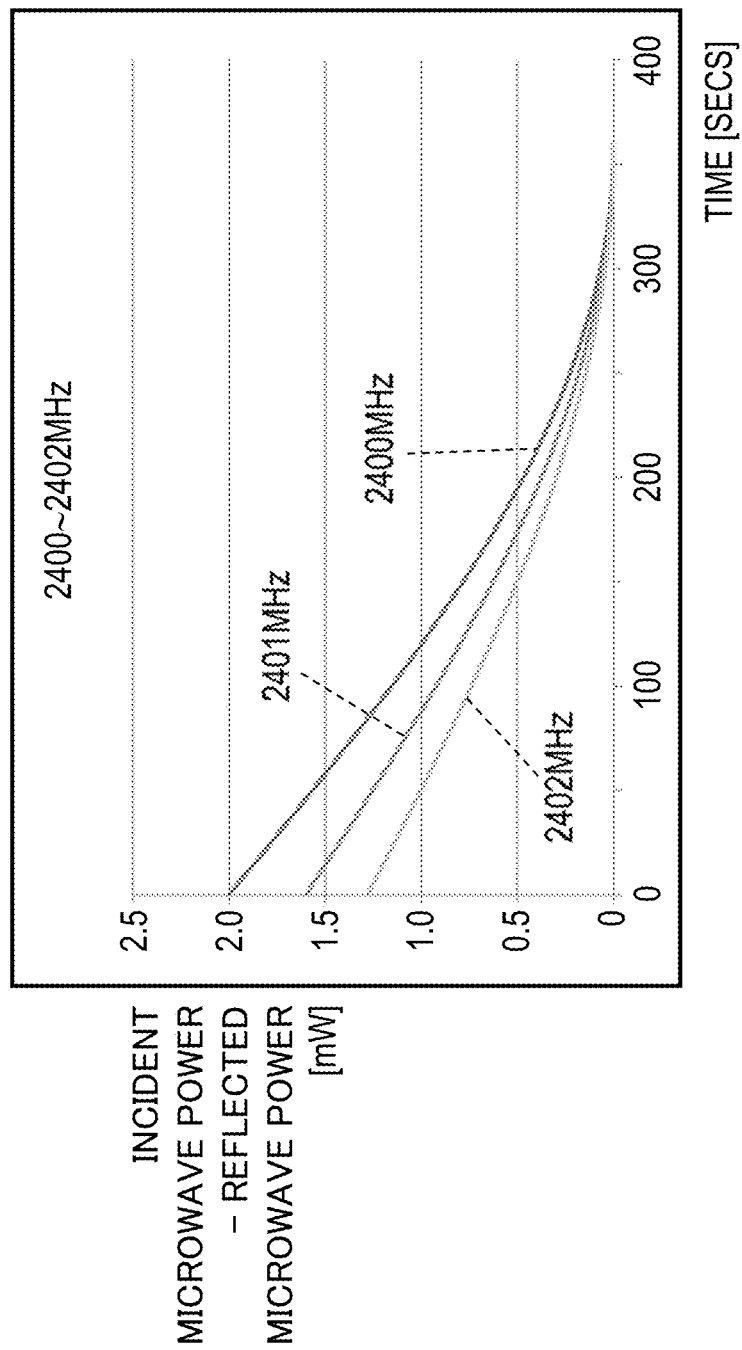
FIG. 10 is a graph showing a temporal change in the difference between incident microwave power and reflected microwave power in Example 9 of an exemplary embodiment.

Example 9 of the present exemplary embodiment will be described. FIG. 10 is a graph showing a temporal change in the microwave power difference in the present example. In the present example, the plurality of frequencies to be used to heat heating target 2 are 2,400 MHz, 2,401 MHz, and 2,402 MHz.

Controller 7 causes high-frequency power generator 3 to repeatedly generate the high-frequency power having these frequencies, as in Examples 7 and 8.

FIG. 10 is a graph showing a temporal change in the microwave power difference that is obtained by repeatedly performing this sequence for approximately 360 seconds.

As shown in FIG. 10, the microwave power difference decreases with time from the start of heating, and the microwave power differences at the frequencies approach each other with time. After the lapse of approximately 350 seconds, the microwave power difference at every frequency becomes zero at substantially the same time.

In Example 9, when controller 7 detects that the difference between the microwave power differences at the plurality of frequencies to be used for heating has fallen below a predetermined threshold value, controller 7 causes amplifier 4 to decrease the output level of the high-frequency power, for example, to turn down or turn off the heating.

The temporal change in the microwave power difference shown in FIG. 10 occurs during the progress of defrosting of frozen peeled shrimps or the like that contain a large amount of water in the case where the frozen peeled shrimps or the like are defrosted.

EXAMPLE 10

Figure 11:
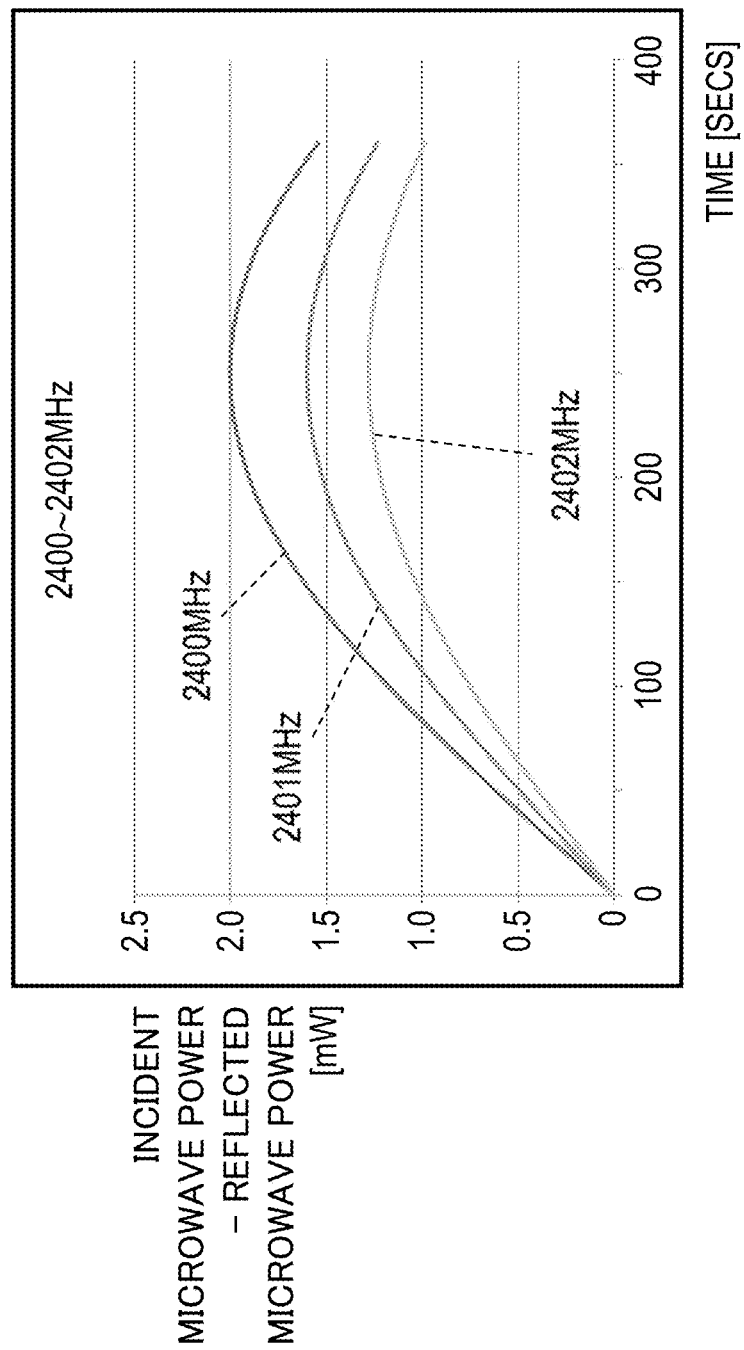
FIG. 11 is a graph showing a temporal change in the difference between incident microwave power and reflected microwave power in Example 10 of an exemplary embodiment.

Example 10 of the present exemplary embodiment will be described. FIG. 11 is a graph showing a temporal change in the microwave power difference in the present example. In the present example, the plurality of frequencies to be used to heat heating target 2 are 2,400 MHz, 2,401 MHz, and 2,402 MHz.

Controller 7 causes high-frequency power generator 3 to repeatedly generate the high-frequency power having these frequencies, as in Example 7.

As shown in FIG. 11, after the lapse of approximately 250 seconds from the start of heating, the temporal change in the microwave power difference at every frequency has a local maximum value. Subsequently, the microwave power difference slowly decreases with time.

It is possible to detect the local maximum value of the temporal change in the reflection ratio by detecting a point in time at which the temporal derivative of the temporal change in the reflection ratio changes from positive to negative. It is possible to detect the increase of the microwave power difference by detecting that the temporal change in the microwave power difference within a predetermined time exceeds a predetermined threshold value.

In Example 10, when controller 7 detects the local maximum value of the temporal change in the microwave power difference at each of the plurality of frequencies to be used for heating, controller 7 causes amplifier 4 to decrease the output level of the high-frequency power, for example, to turn down or turn off the heating.

The temporal change in the microwave power difference shown in FIG. 11 occurs during the progress of boiling of a liquid in the case where the liquid is heated to boiling.

INDUSTRIAL APPLICABILITY

A high-frequency treatment device according to the present disclosure can also be applied to drying devices, heating devices for ceramic art, garbage disposers, semiconductor manufacturing devices, chemical reaction devices, and the like, in addition to cooking appliances.

REFERENCE MARKS IN THE DRAWINGS 1 heating chamber
2 heating target
3 high-frequency power generator
4 amplifier
5 feeder
6 detector
7 controller
8 storage

What is claimed is:

1. A high-frequency treatment device comprising:
   a heating chamber configured to accommodate a heating target;
   a high-frequency power generator operable to generate high-frequency power having a frequency selected from a predetermined frequency band;
   a feeder configured to supply incident microwave power corresponding to the high-frequency power to the heating chamber;
   a detector operable to detect at least one of the incident microwave power and reflected microwave power that is included in the incident microwave power and returns from the heating chamber to the feeder;
   a controller operable to control heating of the heating target by controlling the high-frequency power generator; and
   a storage operable to store, together with the frequency of the high-frequency power and time elapsed from a start of heating, information detected by the detector, wherein
   the controller is operable to cause the high-frequency power generator to repeatedly generate, on a per frequency basis, the high-frequency power having a plurality of frequencies for the heating,
   the controller is operable to determine a state of the heating target on the basis of one of temporal changes in the reflected microwave power at the plurality of frequencies, a temporal changes in a reflection ratio at the plurality of frequencies, and temporal changes in a microwave power difference at the plurality of frequencies, and control the heating, the reflection ratio being a ratio of the reflected microwave power to the incident microwave power, the microwave power difference being a difference between the incident microwave power and the reflected microwave power, and
   the temporal changes in the reflected microwave power at the plurality of frequencies, the temporal changes in the reflection ratio at the plurality of frequencies, and the temporal changes in the microwave power difference at the plurality of frequencies, are obtained based on information from the detector and the storage.

2. The high-frequency treatment device according to claim 1, wherein
   the controller is operable to end the heating of the heating target when an amount of reduction in the temporal changes in one of the reflected microwave power and the reflection ratio within a predetermined time exceeds a predetermined threshold value after the temporal changes in the one of the reflected microwave power and the reflection ratio has a local maximum value.

3. The high-frequency treatment device according to claim 1, wherein
   the controller is operable to control the heating by determining, as being caused by evaporation of water from the heating target, a change in which the temporal changes in one of the reflected microwave power and the reflection ratio slows down.

4. The high-frequency treatment device according to claim 1, wherein
   the controller is operable to control the heating by determining, when the temporal changes in one of the reflected microwave power and the reflection ratio slows down after the one of the reflected microwave power and the reflection ratio increases, decreases, and then increases again, that evaporation of water from the heating target has occurred.

5. The high-frequency treatment device according to claim 1, wherein
the controller is operable to control the heating by determining, as a time slot in which the heating target releases latent heat, a time slot in which the temporal changes in one of the reflected microwave power and the reflection ratio is small after a time slot in which the temporal changes in the one of the reflected microwave power and the reflection ratio is great.

6. The high-frequency treatment device according to claim 1, wherein
the controller is operable to control the heating by determining, as stabilization of a surface state of the heating target, an increase in a degree of overlap between the temporal changes in one of the reflected microwave power and the reflection ratio at the plurality of frequencies.

7. The high-frequency treatment device according to claim 1, wherein
the controller is operable to control the heating by determining a state of the heating target on the basis of a phenomenon in which an order of frequencies arranged in a descending order of the reflection ratio among the plurality of frequencies is reversed as time elapses.

8. The high-frequency treatment device according to claim 1, wherein
the controller is operable to control the heating by determining, on the basis of a change in which the microwave power difference increases with time after the temporal changes in the microwave power difference has a local minimum value, that a small quantity of the heating target is being defrosted.

9. The high-frequency treatment device according to claim 1, wherein
the controller is operable to control the heating by determining, on the basis of a change in which the microwave power difference decreases with time and the temporal changes in the microwave power difference at each of the plurality of frequencies becomes constant, that a large quantity of the heating target is being defrosted.

10. The high-frequency treatment device according to claim 1, wherein
the controller is operable to control the heating by determining, on the basis of a change in which the microwave power difference decreases with time and microwave power differences at the plurality of frequencies approach each other with time, that the heating target that contains a large amount of water is being defrosted.

11. The high-frequency treatment device according to claim 1, wherein
the controller is operable to control the heating by determining, on the basis of a change in which the microwave power difference decreases with time after the temporal changes in the microwave power difference has a local maximum value, that the heating target is boiling.

* * * * *